(12) United States Patent
Richardson et al.

(10) Patent No.: US 9,932,654 B2
(45) Date of Patent: *Apr. 3, 2018

(54) EXTRACTION OF URANIUM FROM WET-PROCESS PHOSPHORIC ACID

(71) Applicant: Urtek, LLC, San Francisco, CA (US)

(72) Inventors: Marcus Worsley Richardson, Goodwood (AU); James Andrew Davidson, Wattle Park (AU); Bryn Llywelyn Jones, Littlehampton (AU); Jessica Mary Page, Toorak Gardens (AU); Karin Helene Soldenhoff, Earlwood (AU); Tomasz Artur Safinski, Cronulla (AU); Manh Toan Tran, Fairfield (AU)

(73) Assignee: Urtek, LLC, San Francisco, CA (US)

( * ) Notice: Subject to any disclaimer, the term of this patent is extended or adjusted under 35 U.S.C. 154(b) by 974 days.

This patent is subject to a terminal disclaimer.

(21) Appl. No.: 14/537,136

(22) Filed: Nov. 10, 2014

(65) Prior Publication Data

US 2015/0078965 A1 Mar. 19, 2015

Related U.S. Application Data

(60) Continuation of application No. 13/664,946, filed on Oct. 31, 2012, now Pat. No. 8,883,096, which is a
(Continued)

(51) Int. Cl.
*C01G 43/00* (2006.01)
*C01G 43/01* (2006.01)
(Continued)

(52) U.S. Cl.
CPC .......... *C22B 60/0265* (2013.01); *C01B 25/22* (2013.01); *C01B 25/237* (2013.01);
(Continued)

(58) Field of Classification Search
CPC ...... C01G 43/00; C01G 43/003; C01G 43/01; C01G 43/025; C01B 25/00; C01B 25/16;
(Continued)

(56) References Cited

U.S. PATENT DOCUMENTS 2,743,154 A   4/1956  Kaufman et al.
2,756,123 A   7/1956  Bailes et al.
(Continued)

FOREIGN PATENT DOCUMENTS

CA   1191696 A1   8/1985
EP   0067583      12/1982
(Continued)

OTHER PUBLICATIONS

PCT Search Report for PCT/US2012/062711.
PCT Search Report of PCT/US2009/051886.

*Primary Examiner* — Natasha Young
(74) *Attorney, Agent, or Firm* — Christopher M. Ramsey; GrayRobinson, P.A.

(57) ABSTRACT

A system for extracting uranium from wet-process phosphoric acid (WPA), includes an ion exchange resin or solvent extractor for separating uranium from WPA to produce a loaded uranium solution stream and a uranium depleted WPA stream. An ion exchange resin is positioned to receive the loaded uranium solution stream and bind uranium species thereto. An anion solution stream is positioned to feed a solution comprising anions onto the ion exchange resin to form a loaded uranium eluant stream. The loaded uranium eluant stream may then be treated to provide a uranium containing product.

15 Claims, 6 Drawing Sheets

Related U.S. Application Data continuation-in-part of application No. 13/555,606, filed on Jul. 23, 2012, now Pat. No. 8,703,077, which is a division of application No. 12/510,294, filed on Jul. 28, 2009, now Pat. No. 8,226,910.

(60) Provisional application No. 61/553,742, filed on Oct. 31, 2011, provisional application No. 61/085,177, filed on Jul. 31, 2008, provisional application No. 61/161,133, filed on Mar. 18, 2009.

(51) Int. Cl.
| | |
|---|---|
| *C01G 43/025* | (2006.01) |
| *C22B 60/00* | (2006.01) |
| *C22B 60/02* | (2006.01) |
| *C01B 25/00* | (2006.01) |
| *C01B 25/16* | (2006.01) |
| *C01B 25/18* | (2006.01) |
| *C01B 25/22* | (2006.01) |
| *C01B 25/234* | (2006.01) |
| *C01B 25/237* | (2006.01) |
| *C01B 25/238* | (2006.01) |

(52) U.S. Cl.
CPC .......... *C01B 25/238* (2013.01); *C01G 43/003* (2013.01); *C01G 43/01* (2013.01)

(58) Field of Classification Search
CPC ....... C01B 25/18; C01B 25/22; C01B 25/234; C01B 25/237; C01B 25/238; C22B 60/00–60/0204; C22B 60/0217; C22B 60/0252; C22B 60/0265
See application file for complete search history.

(56) References Cited

U.S. PATENT DOCUMENTS

| | | | |
|---|---|---|---|
| 2,767,045 A | 10/1956 | McCullough | |
| 2,768,059 A | 10/1956 | Bailes et al. | |
| 2,770,520 A | 11/1956 | Long et al. | |
| 2,789,879 A | 4/1957 | Kaufman | |
| 2,859,092 A | 11/1958 | Bailes et al. | |
| 2,882,123 A | 4/1959 | Long | |
| 3,044,855 A | 7/1962 | Young | |
| 3,157,462 A | 11/1964 | Hendrickson | |
| 3,576,601 A | 4/1971 | Cochran | |
| 3,711,591 A | 1/1973 | Hurst et al. | |
| 3,770,612 A | 11/1973 | Gray et al. | |
| 3,869,536 A | 3/1975 | James | |
| 3,880,980 A | 4/1975 | Wamser | |
| 3,975,178 A | 8/1976 | McCullough et al. | |
| 4,105,741 A | 8/1978 | Wiewiorowski et al. | |
| 4,110,422 A | 8/1978 | Hill | |
| 4,118,457 A | 10/1978 | Seko | |
| 4,152,402 A | 5/1979 | Walters, Jr. et al. | |
| 4,180,545 A | 12/1979 | McCullough et al. | |
| 4,199,470 A | 4/1980 | Yasuda et al. | |
| 4,206,049 A | 6/1980 | Stana et al. | |
| 4,225,396 A | 9/1980 | Graham et al. | |
| 4,236,911 A | 12/1980 | McCullough et al. | |
| 4,258,013 A * | 3/1981 | Pyrih .................... | C22B 60/026 423/10 |
| 4,279,705 A | 7/1981 | Riggs, Jr. | |
| 4,280,904 A | 7/1981 | Carlson | |
| 4,280,985 A | 7/1981 | Yan | |
| 4,284,606 A | 8/1981 | Rendell et al. | |
| 4,301,122 A | 11/1981 | Johnson | |
| 4,302,427 A | 11/1981 | Berry et al. | |
| 4,305,912 A | 12/1981 | Pyrih et al. | |
| 4,316,800 A | 2/1982 | Stana et al. | |
| 4,325,918 A | 4/1982 | Luke et al. | |
| 4,341,602 A | 7/1982 | Nenner et al. | |
| 4,356,154 A | 10/1982 | Lopez et al. | |
| 4,371,504 A | 2/1983 | Leaders et al. | |
| 4,371,505 A | 2/1983 | Pautrot | |
| 4,397,820 A | 8/1983 | Stana et al. | |
| 4,402,917 A | 9/1983 | Largman et al. | |
| RE31,456 E | 12/1983 | Carlson | |
| 4,427,640 A | 1/1984 | Bowerman et al. | |
| 4,432,945 A | 2/1984 | Hurst et al. | |
| 4,438,077 A | 3/1984 | Tsui | |
| 4,461,746 A | 7/1984 | Bierman et al. | |
| 4,485,078 A | 11/1984 | Weston et al. | |
| 4,510,122 A | 4/1985 | Floreancig | |
| 4,578,249 A | 3/1986 | Srinivasan et al. | |
| 4,599,221 A | 7/1986 | Ketzinel et al. | |
| 4,606,894 A | 8/1986 | Kunin et al. | |
| 4,634,580 A | 1/1987 | Jdid et al. | |
| 4,748,008 A | 5/1988 | Takeda | |
| 4,781,905 A | 11/1988 | Yu-Ming et al. | |
| 4,968,504 A | 11/1990 | Rourke | |
| 5,130,001 A | 7/1992 | Snyder et al. | |
| 5,437,848 A | 8/1995 | Hard | |
| 5,489,616 A | 2/1996 | Park et al. | |
| 5,573,738 A | 11/1996 | Ma et al. | |
| 5,787,332 A | 7/1998 | Black et al. | |
| 5,885,465 A | 3/1999 | Bray et al. | |
| 6,303,090 B1 | 10/2001 | Rothman et al. | |
| 6,645,453 B2 | 11/2003 | Singh et al. | |
| 7,294,271 B1 | 11/2007 | Huffman et al. | |
| 7,655,199 B2 | 2/2010 | Cable et al. | |
| 7,959,812 B2 | 6/2011 | Theoleyre et al. | |
| 8,226,910 B2 | 7/2012 | Bristow et al. | |
| 8,685,349 B2 | 4/2014 | Bristow et al. | |
| 8,703,077 B2 | 4/2014 | Chalmers et al. | |
| 8,883,096 B2 | 11/2014 | Richardson et al. | |
| 2003/0113247 A1 | 6/2003 | Singh et al. | |
| 2009/0022638 A1 | 1/2009 | Rossoni et al. | |
| 2009/0032403 A1 | 2/2009 | Malhorta | |
| 2010/0028226 A1 | 2/2010 | Bristow et al. | |
| 2011/0024704 A1 | 2/2011 | Soderquist et al. | |

FOREIGN PATENT DOCUMENTS

| | | |
|---|---|---|
| EP | 0132902 B1 | 9/1998 |
| IT | 1230853 | 11/1991 |
| JP | 58009823 | 1/1983 |
| KR | 870002187 | 12/1987 |
| KR | 890003974 | 10/1989 |

* cited by examiner

EXTRACTION OF URANIUM FROM WET-PROCESS PHOSPHORIC ACID

CROSS-REFERENCE TO RELATED APPLICATIONS

This is a continuation of U.S. application Ser. No. 13/664,946, filed Oct. 31, 2012, now issued U.S. Pat. No. 8,883,096, which claims the benefit of U.S. provisional Application No. 61/553,742, filed Oct. 31, 2011; and is a continuation-in-part of U.S. application Ser. No. 13/555,606, filed on Jul. 23, 2012, now issued U.S. Pat. No. 8,703,077, which is a divisional of U.S. application Ser. No. 12/510,294, filed Jul. 28, 2009, now issued U.S. Pat. No. 8,226,910 which claims the benefit of U.S. provisional Application No. 61/085,177, filed Jul. 31, 2008 and U.S. provisional Application No. 61/161,133, filed Mar. 18, 2009. Each of these references is incorporated herein by reference in its entirety and all commonly owned.

FIELD OF THE INVENTION

The invention relates to the field of extracting uranium from wet-process phosphoric acid.

BACKGROUND

Phosphoric acid ($H_3PO_4$) for use in fertilizer production is typically produced by a wet-process during which naturally occurring phosphate rock is reacted with sulphuric acid to provide so called wet-process phosphoric acid (WPA). Depending on the source of the phosphate rock, it may contain valuable metals such as uranium, vanadium and yttrium, which are dissolved by the sulphuric acid and form impurity constituents of the WPA.

In the United States, plants have been in operation since the early 1950's to recover valuable amounts of uranium from WPA. However, with fluctuations in the spot price of uranium it is important that it can be extracted from the WPA in a cost-effective manner. To date, many of the plants that have operated uranium extraction processes have utilized solvent extraction process to extract the uranium from the WPA. Another process that has received greater attention in recent times is an ion exchange process whereby WPA containing uranium is loaded onto an ion exchange resin. The WPA is flushed from the resin, leaving the uranium bound to the resin. The uranium is then eluted from the resin. U.S. Pat. No. 4,599,221 (Ketzinel et al.) discloses such a process for extracting uranium from WPA using an ion exchange process.

Unfortunately, the known uranium extraction processes are not all that simple to carry out. Part of the problem is that the WPA is a crude material containing a range of organic and inorganic contaminants or species that can interfere with the extraction process and have a profound effect on the commercial viability of the process.

The applicant has previously discovered that certain process efficiencies are achieved by lowering the iron concentration of the WPA, reducing the valency of any remaining ferric iron in the WPA to ferrous iron, and then extracting uranium compounds from the WPA. These details are disclosed in U.S. Pat. No. 8,226,910, which is incorporated by reference in its entirety.

There remains a need for other improved processes for extracting uranium from WPA that overcome one or more of the problems associated with others' processes and/or that are more efficient.

SUMMARY

In a first aspect, the invention provides a process for extracting uranium from wet-process phosphoric acid (WPA), the process comprising: (a) separating uranium from WPA to produce a loaded uranium solution stream and a uranium depleted WPA stream; (b) contacting the loaded uranium solution stream with an ion exchange resin; (c) eluting uranium species bound to the ion exchange resin by contacting the resin with a solution comprising anions to produce a loaded uranium eluant stream; and (d) treating the loaded uranium eluant stream to provide a uranium containing product.

In some embodiments, the anions used to elute the uranium species in step (c) are selected from the group consisting of chloride anions, sulphate anions, nitrate anions, and combination thereof.

In some embodiments of the first aspect of the invention, step (a) is preceded by a valency reduction step comprising reducing the valency of ferric ions in the WPA. The valency reduction step may be carried out by chemical reduction, such as by the addition of metallic iron, ferro-phosphorus alloy or ferro-silicon alloy; or by electrochemical reduction (ER).

In some embodiments of the first aspect of the invention, step (a) and/or the valency reduction step (if used) may be preceded by an iron removal step. The iron removal step comprises lowering the concentration of iron in the WPA by decreasing the amount of dissolved iron species in the WPA relative to the amount of uranium species in the WPA to produce a lowered iron content WPA having uranium species therein. The concentration of iron in the WPA may be lowered by precipitating at least some of the iron present in the WPA as iron ammonium phosphate.

In a second aspect, the invention provides a process for extracting uranium from wet-process phosphoric acid (WPA), the process comprising: (a) contacting uranium laden WPA with a first ion exchange resin to form uranium depleted WPA; (b) separating the uranium depleted WPA from the first ion exchange resin; (c) oxidizing uranium species on the first ion exchange resin by contacting the first ion exchange resin with an oxidant; (d) contacting the first ion exchange resin with ammonia to remove impurities from the resin, the impurities being vanadium ions, organic species, or a combination thereof; (e) separating the impurities from the first ion exchange resin; (f) removing the oxidized uranium species from the first ion exchange resin by contacting the resin with ammonium carbonate to form a uranium enriched ammonium carbonate stream; (g) contacting the uranium enriched ammonium carbonate stream with a second ion exchange resin to form uranium depleted ammonium carbonate; (h) separating the uranium depleted ammonium carbonate from the second ion exchange resin; and (i) eluting uranium species from the second ion exchange resin to form a uranyl solution.

In some embodiments, the oxidant is selected from the group consisting of: air, oxygen, hydrogen peroxide, WPA, and combinations thereof.

In some embodiments, the elution in step (i) is carried out using a solution comprising anions selected from the group consisting of chloride anions, nitrate anions, sulphate anions, and combinations thereof.

In some embodiments of the second aspect of the invention, step (a) may be preceded by a valency reduction step comprising reducing the valency of ferric ions in the WPA. The valency reduction step may be carried out by chemical reduction, such as by the addition of metallic iron, ferrophosphorus alloy or ferro-silicon alloy; or by electrochemical reduction (ER).

In some embodiments of the second aspect of the invention, step (a) and/or the valency reduction step (if used) may be preceded by an iron removal step. The iron removal step comprises lowering the concentration of iron in the WPA by decreasing the amount of dissolved iron species in the WPA relative to the amount of uranium species in the WPA to produce a lowered iron content WPA having uranium species therein. The concentration of iron in the WPA may be lowered by precipitating at least some of the iron present in the WPA as iron ammonium phosphate.

In a third aspect, the invention provides a process for extracting uranium from wet-process phosphoric acid (WPA), the process comprising: (a) contacting uranium laden WPA with an oxidant to form an oxidized WPA stream; (b) contacting the oxidized WPA stream with an organic solvent; (c) separating a uranium enriched organic solvent stream from an aqueous WPA stream; (d) contacting the uranium enriched organic solvent stream with an ammonium carbonate stream to form a uranium enriched ammonium carbonate stream; (e) contacting the uranium enriched ammonium carbonate stream with an ion exchange resin; (f) separating a uranium depleted ammonium carbonate stream from the ion exchange resin; (g) contacting the ion exchange resin with a solution comprising chloride ions; and (h) separating a uranyl solution from the ion exchange resin.

In some embodiments, the organic solvent used in step (b) comprises a di(2-ethylhexyl)phosphoric acid and trioctylphosphine oxide (i.e. a "DEHPA TOPO" system).

In some embodiments of the third aspect of the invention, the valency reduction step is preceded by an iron removal step. The iron removal step comprises lowering the concentration of iron in the WPA by decreasing the amount of dissolved iron species in the WPA relative to the amount of uranium species in the WPA to produce a lowered iron content WPA having uranium species therein. The concentration of iron in the WPA may be lowered by precipitating at least some of the iron present in the WPA as iron ammonium phosphate.

In some embodiments of any of the first, second, or third aspects of the invention, the uranyl solution may be further treated to provide a uranium containing product. The further treatment may comprise a precipitation step.

BRIEF DESCRIPTION OF DRAWINGS

For a further understanding of the invention, reference is made to the following detailed description, taken in connection with the accompanying drawings illustrating various embodiments of the present invention, in which.

DETAILED DESCRIPTION OF PREFERRED EMBODIMENTS

The invention will now be described with reference to the accompanying drawings in which preferred embodiments of the invention are shown. The invention may, however, be embodied in many different forms and should not be construed as limited solely to the embodiments described herein.

Figure 1:
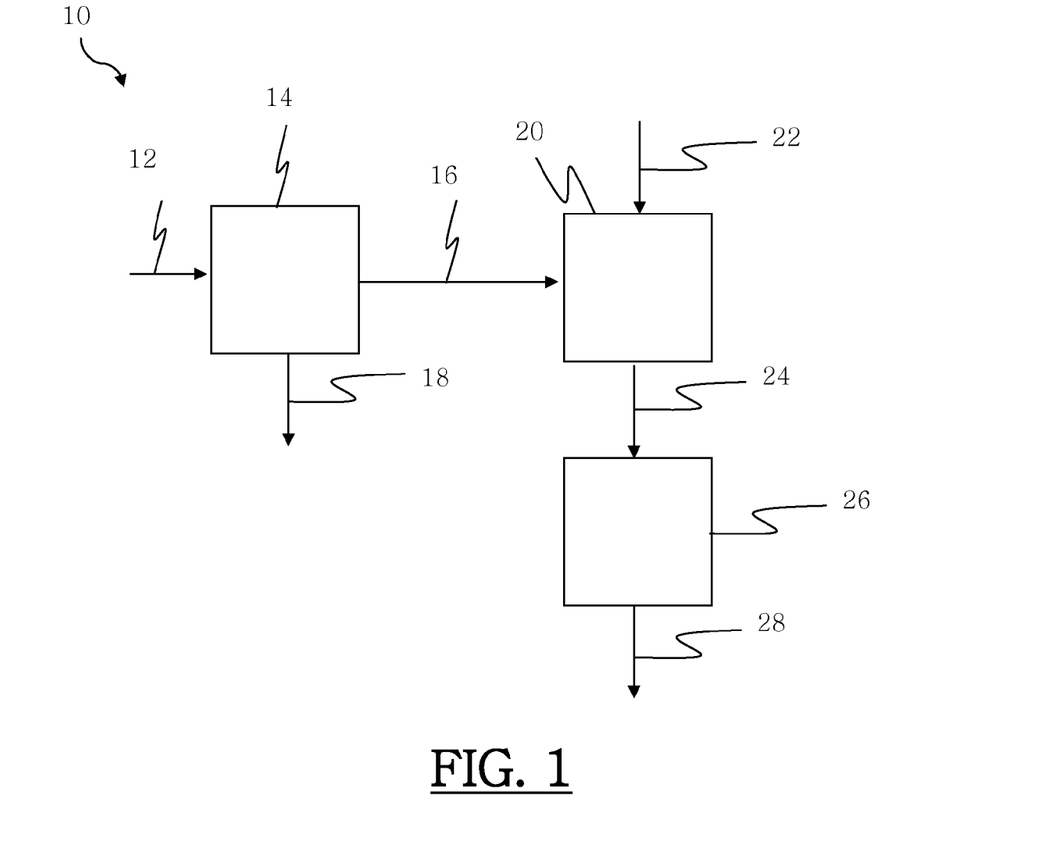
FIG. 1 illustrates a general flow chart for a process according to a first exemplary embodiment of the invention.

FIG. 1 is a flow chart of a first exemplary embodiment of the invention, which is a process 10 for extracting uranium from wet-process phosphoric acid (WPA) 12. The process 10 comprises a first separation step 14 in which uranium is separated from the WPA in a first ion exchange (IX) or solvent extraction (SX) step. The first separation step 14 provides a loaded uranium solution stream 16 and a uranium depleted WPA stream 18. The loaded uranium solution stream 16 is then contacted with an anion exchange resin in a secondary ion exchange step 20. During the ion exchange step 20 uranium species are bound to the anion exchange resin. The bound uranium species are then eluted from the anion exchange resin by contacting the resin with a solution comprising chloride ions 22 to produce a loaded uranium eluant stream 24. Other anions that could be used to elute the bound uranium species from the anion exchange resin include nitrate and sulphate. In some embodiments, the secondary ion exchange step 20 may be carried out using a cation exchange resin or a chelating resin. The loaded uranium eluant stream 24 is then treated in a further treatment step 26 to provide a uranium containing product 28.

The wet-process phosphoric acid (WPA) 12 may be any WPA feed. WPA is typically produced by reacting phosphate rock with sulphuric acid. Prior to it being fed into the process of the present invention, the WPA may be treated in one or more pre-treatment steps. For example, the WPA feed 12, at a concentration of approximately 30% WPA may contain a significant amount of suspended solids, mostly sodium fluorosilicates and gypsum, which may cause issues for later stages of the process. In these cases, the WPA may be clarified. The clarification step may comprise filtering the WPA to remove insoluble matter. Specifically, the clarification step may use an existing clarifier in a WPA plant and additional clarifiers, complementing the pre-existing clarifiers, are used to reduce the total suspended solids (TSS) and decrease process fluctuations due to upstream changes. In these embodiments, WPA can, for instance, be clarified in conventional clarifiers. The clarifiers are dosed with flocculant to encourage precipitation of suspended solids. Underflow from the clarifier may be transferred back to the clarifier with the overflow being transferred to the next stage of the process.

Preferably, the WPA 12 is an aqueous solution comprising from about 20% by weight to about 40% by weight WPA. In some embodiments, the WPA 12 is an aqueous solution comprising about 30% by weight WPA.

The first separation step 14 may be an ion exchange (IX) step or a solvent exchange (SX) step.

In some embodiments, the first separation step 14 is an ion exchange step. WPA feed 12 (which may or may not be a lowered iron content WPA or a valency reduced WPA as described in more detail below) is transferred to one or more ion exchange (IX) columns containing a chelating ion exchange resin. Typically, each train of IX columns will nominally have one lead column, one catch (or tail) column and one column in elution/idle mode at any one time. The uranium depleted WPA stream 18 is returned to WPA holding tanks to be used for fertilizer production, etc.

Once one of the IX columns in the train is loaded it is taken offline and eluted. The elution procedure comprises eluting the IX column with eight Bed Volumes (BV) of ammonium carbonate solution. Uranium forms a stable, soluble uranyl tricarbonate complex in the ammonium carbonate solution, whereas impurities such as iron will form insoluble compounds. Precipitated iron can be removed from the eluate using filters prior to entering secondary IX where further rejection of impurities takes place. The loaded uranium solution stream 16 containing uranyl carbonate from the first separation step 14 is then passed to the secondary anion exchange step 20, to extract the uranium onto the resin, and to recycle the ammonium carbonate. If necessary, a nominal 10% bleed may be removed to control impurity build up in the eluant and may be replaced with fresh ammonium carbonate solution. The uranium bound to the IX column in the secondary anion exchange step 20 is then eluted using a solution containing chloride ions 22 to produce a uranium containing product 28. Other anions that can be used for this step include sulphate and nitrate.

In some other embodiments, the first separation step 14 is a solvent extraction step. WPA feed 12 (which may or may not be a lowered iron content WPA or a valency reduce WPA as described in more detail below) may be transferred to an oxidation stage in which the WPA is oxidized with an air/oxygen mixture and/or with a chemical oxidant, such as hydrogen peroxide or a WPA stream. The oxidized WPA is then transferred to a solvent extractor. The solvent extraction step 14 uses any organic solvent that has a high affinity for uranium. Examples of solvents of this type include a DEHPA TOPO (di-2-ethylhexyl phosphoric acid and trioctylphosphine oxide) system. In some embodiments, the solvent extraction step 14 is a multi-extraction DEHPA TOPO (di-2-ethylhexyl phosphoric acid and trioctylphosphine oxide) system, nominally with a concentration of 0.5M DEHPA and 0.125M TOPO in a kerosene based organic diluent, operated at around 40° C. Further details of the DEHPA TOPO can be found in Hurst et al., *Ind. Eng. Chem. Process Des. Develop.*, 1972, 11, 122-128, the details of which are incorporated herein by reference. The uranium depleted WPA stream 18 is returned to WPA holding tanks to be used for fertilizer production, etc.

In some embodiments, the pregnant organic phase is stripped with ammonium carbonate to provided loaded uranium solution stream 16.

The process described in relation to FIG. 1 may be varied to add additional steps as required. For example, different sources of phosphate rock have different compositions. As a result, feed streams of WPA from different sources of phosphate rock will typically have different impurities, any of which may interfere with the uranium extraction process. Consequently, further steps may be incorporated into the process of the present invention to improve the efficiency of the uranium extraction. Some further embodiments of the process of the present invention incorporating the further steps will now be described.

Figure 2:
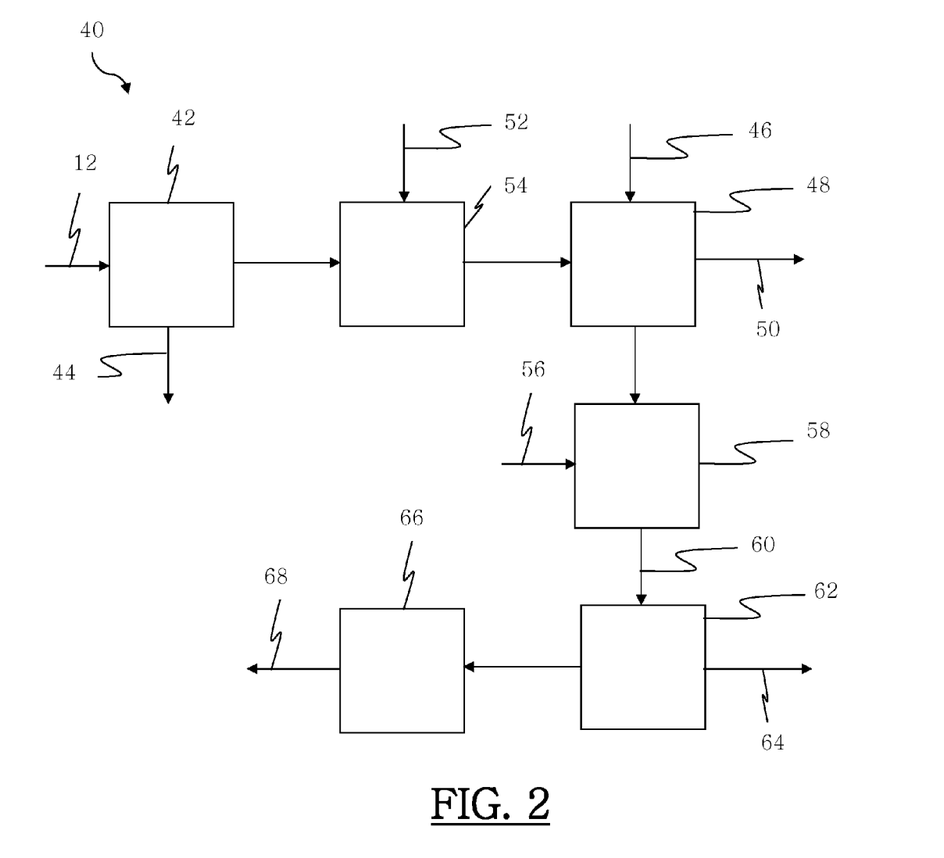
FIG. 2 illustrates a general flow chart for a process according to a second exemplary embodiment of the invention.

FIG. 2 is a flow chart describing a second exemplary embodiment of the invention which is a process 40 for extracting uranium from wet-process phosphoric acid (WPA) 12. The process 40 comprises contacting uranium laden WPA 12 with a first ion exchange resin in a first ion exchange step 42. The first ion exchange resin is a chelating resin. A uranium depleted WPA stream 44 is separated from the first ion exchange resin and the resin is then contacted with an oxidant 52 in an oxidation step 54 under conditions to oxidize substantially all of the uranium species on the resin. The first ion exchange resin is then contacted with a stream comprising ammonia 46 in a stripping step 48 under conditions to remove at least some of any bound vanadium ions and/or organic species from the resin. A vanadium and/or organic species enriched stream 50 is then separated from the first ion exchange resin. The first ion exchange resin is subsequently contacted with an ammonium carbonate stream 56 in an elution step 58 under conditions to remove the oxidized uranium species from the resin and provide a uranium enriched ammonium carbonate stream 60. The uranium enriched ammonium carbonate stream 60 is then contacted with an anion exchange resin in a second ion exchange step 62 and a uranium depleted ammonium carbonate stream 64 is separated from the second ion exchange resin. The uranium species are then eluted from the second ion exchange resin in an elution step 66 to provide a uranyl solution 68. The elution step 66 may be carried out using a solution comprising suitable anions, such as chloride, nitrate or sulphate.

Figure 3:
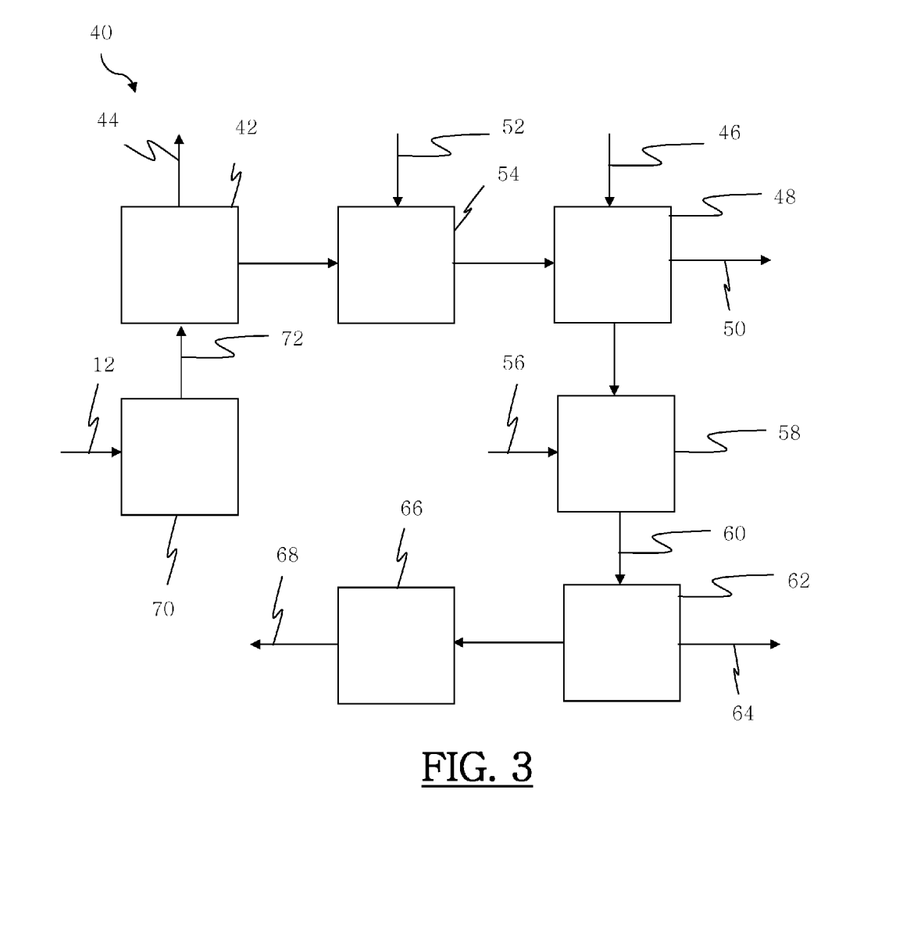
FIG. 3 illustrates a general flow chart for a process according to a third exemplary embodiment of the invention.

FIG. 3 is a flow chart describing a third exemplary embodiment of the invention which is a process 40 for extracting uranium from wet-process phosphoric acid (WPA) 12. Process steps 42, 48, 54, 58, 62 and 64 in this embodiment are the same as those described in respect of the second exemplary embodiment and shown FIG. 2. In the third embodiment, the first ion exchange step 42 is preceded by a valency reduction step 70. The valency reduction step 70 comprises reducing the valency of ferric ions in the WPA 12 to produce a valency reduced WPA 72 which is then subjected to first ion exchange step 42. The valency reduction step 70 may be important because any ferric iron has a deleterious effect on subsequent process steps of the uranium extraction process. The ion exchange (IX) resin used in subsequent step(s) for the extraction of uranium has a high affinity to load ferric ($Fe^{3-}$) ions, which inhibits uranium loading. For this reason, it is preferable for the iron in the WPA feed 12 to be in the ferrous ($Fe^{2+}$) state.

The valency reduction in valency reduction step 70 may be carried out by contacting the WPA containing ferric ($Fe^{3+}$) ions with a suitable reducing agent. Suitable agents for this purpose include (but are not limited to): metallic iron; ferro-phosphorus alloy; and ferro-silicon alloy. Alternatively, or in addition, the valency reduction in valency reduction step 70 may be carried out by reducing the ferric ($Fe^{3+}$) ions in the WPA in an electroreduction step.

In some embodiments, the valency reduction step 70 comprises adding metallic iron to a reactor containing WPA 12 in order to reduce the ferric iron to ferrous iron. For example, concentrate may be pumped into three agitated tanks with a total residence time of three hours. Powdered or granular iron may be added into the first of two reactors at 120% stoichiometric equivalent (relative to the amount of ferric iron). Alternatively, the metallic iron could be substituted with or used in combination with ferro-phosphorus alloy or ferro-silicon alloy.

In some embodiments, the valency reduction step 70 comprises electroreduction. Electroreduction may be advantageous because no chemical species are added to the WPA and it is easy to control electrolytic reduction. In one form of the electroreduction stage WPA feed is transferred to continuously operated electroreduction cells.

Figure 4:
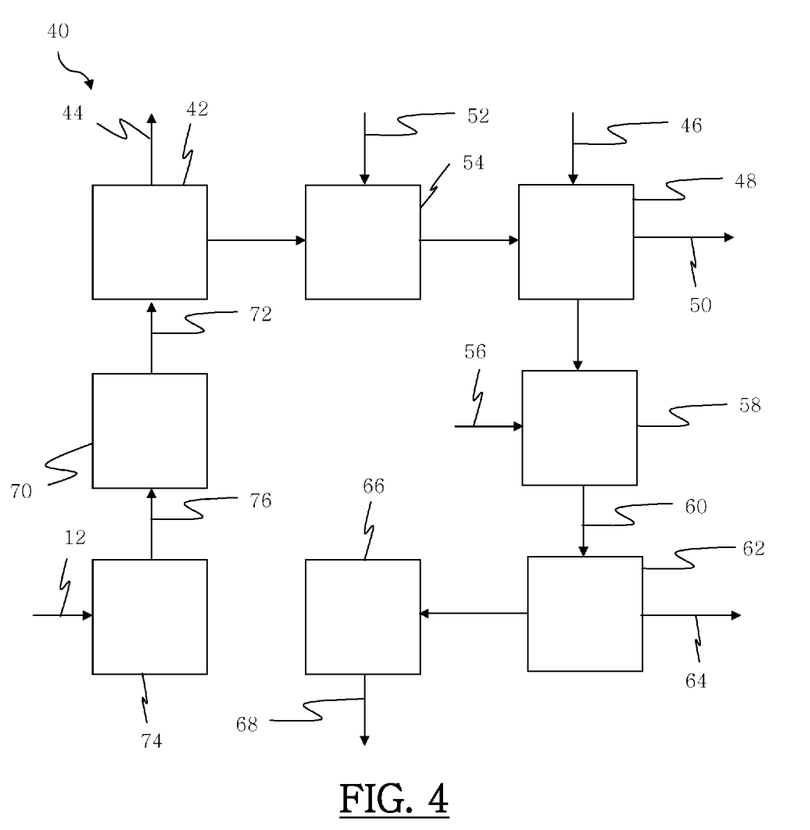
FIG. 4 illustrates a general flow chart for a process according to a fourth exemplary embodiment of the invention.

FIG. 4 is a flow chart describing a fourth exemplary embodiment of the invention which is a process 40 for extracting uranium from wet-process phosphoric acid (WPA) 12. Process steps 42, 48, 54, 58, 62, 64 and 70 in this embodiment are the same as those described in respect of the third exemplary embodiment and shown FIG. 3. In the fourth embodiment, the valency reduction step 70 is preceded by an iron removal step 74. The iron removal step 74 comprises decreasing the amount of dissolved iron species in the WPA relative to the amount of uranium species in the WPA to produce a lowered iron content WPA 76 having uranium species therein 76. The lowered iron content WPA 76 has a lower amount of dissolved iron species than the raw WPA 12. The lowered iron content WPA 76 is then subjected to the valency reduction step 70, which involves subjecting the lowered iron content WPA 76 to a reduction step, wherein the valency of dissolved iron species remaining in the lowered iron content WPA 76 is reduced.

The aim of the iron removal stage 74 is to lower the iron content. This can be done by removing the majority of the total iron present through precipitation of an iron ammonium phosphate (IAP) compound from the feed or pretreated WPA. The IAP precipitation step is designed to remove a portion of the ferric iron, as a partial step prior to the valency reduction step. Additionally IAP precipitation reduces scaling species (fluorosilicate and gypsum) in the lowered iron content WPA 76 prior to an ion exchange step which, in turn, improves operability of the ion exchange step.

In the iron removal step of the exemplary embodiments, WPA is transferred to a small pre-mix tank ammonia is added at a stoichiometric excess of approximately 300-1000% of the calculated ammonia requirements for formation of IAP. From the pre-mix tank, the treated stream is transferred to overflow reactors. The treated stream has a total residence time of 7 to 12 hours in the overflow reactors to allow completion of the IAP precipitation process. The overflow from the overflow reactor is transferred to a centrifuge, or other solid liquid separation device, where IAP is separated from the WPA. The lowered iron content WPA 76 (low solid concentration) is then transferred to the iron valency reduction step 70.

Figure 5:
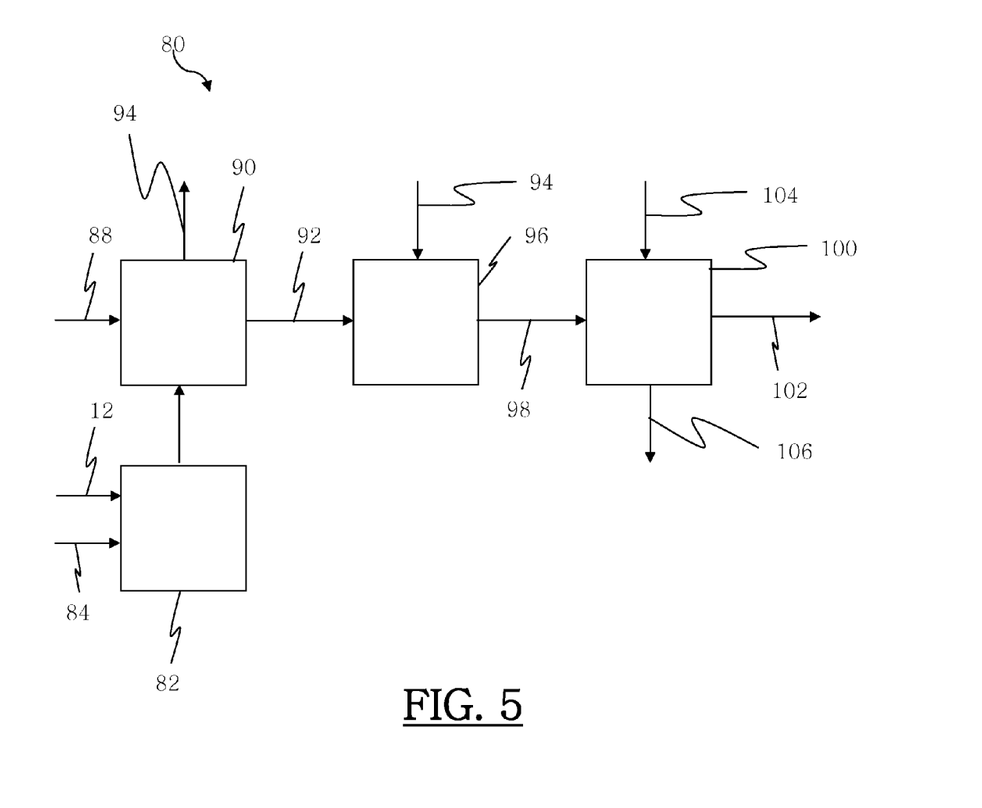
FIG. 5 illustrates a general flow chart for a process according to a fifth exemplary embodiment of the invention.

FIG. 5 is a flow chart describing a fifth exemplary embodiment of the invention which is a process 80 for extracting uranium from wet-process phosphoric acid (WPA) 12. The process 80 comprises an oxidation step 82 in which uranium laden WPA 12 is contacted with an oxidant 84 to provide an oxidized WPA stream 86. The oxidized WPA stream 86 is then contacted with a solvent 88 comprising di(2-ethylhexyl)phosphoric acid and trioctylphosphine oxide in a solvent extraction step 90. A uranium enriched organic solvent stream 92 is then separated from a WPA containing aqueous stream 94 and the uranium enriched organic solvent stream 92 is contacted with an ammonium carbonate solution 94 in a stripping step 96 under conditions to provide a uranium enriched ammonium carbonate stream 98. The uranium enriched ammonium carbonate stream 98 is then contacted with an ion exchange resin in an ion exchange step 100. A uranium depleted ammonium carbonate stream 102 is separated from the ion exchange resin and the resin is contacted with a solution containing chloride ions 104 and a uranyl solution 106 is separated from the ion exchange resin.

Figure 6:
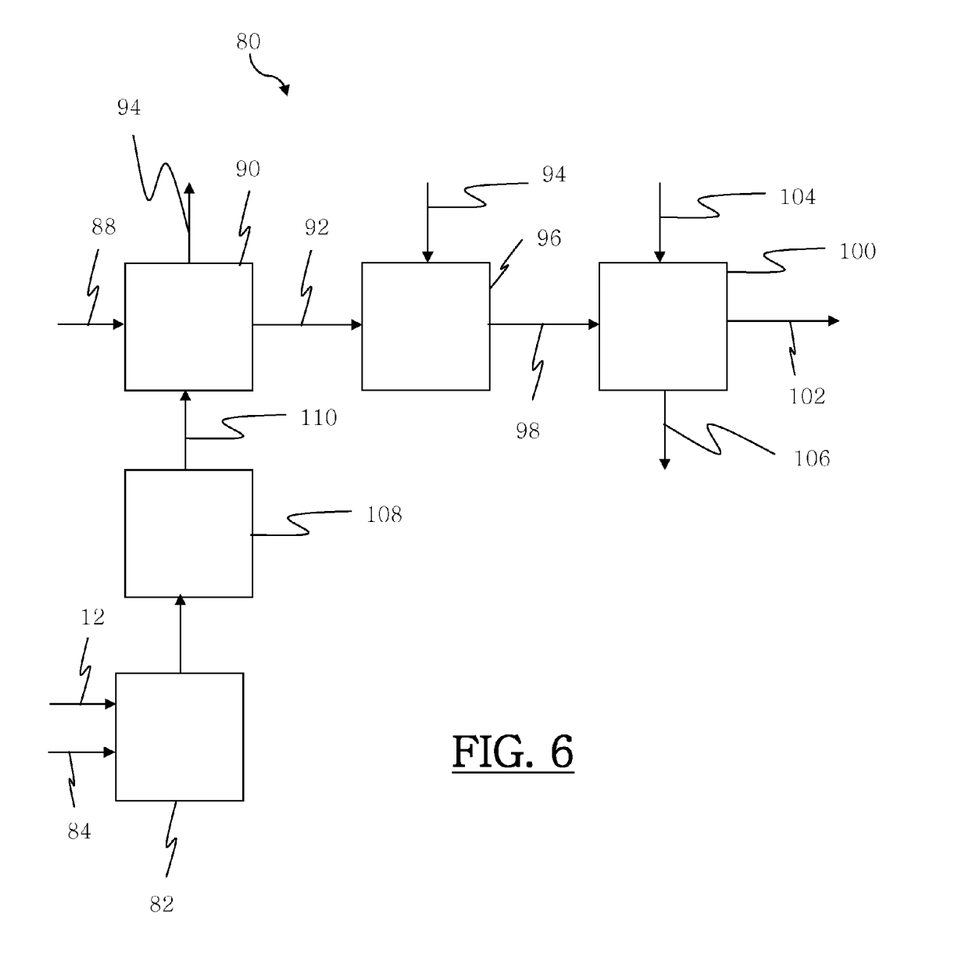
FIG. 6 illustrates a general flow chart for a process according to a sixth exemplary embodiment of the invention.

FIG. 6 is a flow chart describing a sixth exemplary embodiment of the invention which is a process 80 for extracting uranium from wet-process phosphoric acid (WPA) 12. Process steps 82, 90, 96 and 100 in this embodiment are the same as those described in respect of the fifth exemplary embodiment and shown FIG. 5. In the sixth embodiment, the solvent extraction step 90 is preceded by an iron removal step 108. The iron removal step 108 comprises lowering the concentration of iron in the WPA 12 to produce a lowered iron content WPA 110 that is then subjected to the solvent extraction step 90. The iron removal step may be carried out as described previously.

In any of the exemplary embodiments, the uranium containing product 28 or uranyl solution 106 may be further treated to produce a commercial uranium product. In some embodiments, the uranium may be precipitated from the uranium containing product 28 or uranyl solution 106. The step of precipitating the uranium from the uranium containing product 28 or uranyl solution 106 comprises acidification and removal of carbon dioxide generated, formation of a uranyl peroxide through the addition of hydrogen peroxide, as well as caustic soda as required for maintaining a suitable pH for the precipitation reaction. The step of drying the precipitated product involves thickening the precipitate in a high rate thickener and drying in a low temperature dryer at 260° C.

The uranium containing product 28 or uranyl solution 106 is pumped into the first of three tanks in series. Hydrogen peroxide and caustic soda is added to enable precipitate uranium of oxides. The total residence time in the precipitation reactors is three hours. The underflow is transferred to a thickener, followed by drying of the precipitate at around 260° C. and subsequent drumming into drums and finally packaging into shipping containers.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

It will be appreciated by persons skilled in the art that numerous variations and/or modifications may be made to as shown in the specific embodiments without departing from the spirit or scope of the invention. The present embodiments are, therefore, to be considered in all respects as illustrative and not restrictive.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of claims supported by this disclosure.

That which is claimed is:

1. A system for extracting uranium from wet-process phosphoric acid (WPA), the system comprising:
    a first ion exchange resin positioned to receive uranium laden WPA and bind uranium species from the uranium laden WPA thereon to form a uranium depleted WPA stream;
    an oxidant stream positioned to feed an oxidant onto the first ion exchange resin for oxidizing uranium species thereon;
    an ammonium carbonate stream positioned to feed ammonium carbonate onto the first ion exchange resin after the uranium species thereon are oxidized to elute the first ion exchange resin and form a uranium enriched ammonium carbonate stream;
    a second ion exchange resin positioned to receive the uranium enriched ammonium carbonate stream and bind uranium species in the uranium enriched ammonium carbonate stream thereto; and
    an anion solution stream positioned to feed a solution comprising anions onto the second ion exchange resin to and elute the second ion exchange resin to form a loaded uranium eluant stream.

2. The system of claim 1, wherein the oxidant is at least one oxidant selected from the group consisting of air, oxygen, hydrogen peroxide, and WPA.

3. The system of claim 1, wherein the anions in the solution comprising anions are at least one anion selected from the group consisting of chloride anions, sulphate anions, and nitrate anions.

4. The system of claim 1, wherein the anions in the solution comprising anions include chloride ions.

5. The system of claim 1, further comprising a valency reduction stage upstream from the first ion exchange resin for reducing a valency of ferric ions in the uranium laden WPA before the uranium laden WPA contacts the first ion exchange resin.

6. The system of claim 1, wherein the first ion exchange resin is an anion exchange resin.

7. The system of claim 1, wherein the second ion exchange resin is a chelating ion exchange resin.

8. The system of claim 1, wherein:
the first ion exchange resin is an anion exchange resin; and
the second ion exchange resin is a chelating ion exchange resin.

9. A system for extracting uranium from wet-process phosphoric acid (WPA), the system comprising:
an oxidizing stage positioned to receive uranium laden WPA and contact the uranium laden WPA with an oxidant to form an oxidized WPA stream;
a solvent extractor positioned to contact the oxidized WPA stream with an organic solvent to form a uranium enriched organic solvent stream;
an ammonium carbonate stream positioned to contact the uranium enriched organic solvent stream to form a uranium enriched ammonium carbonate stream;
an ion exchange resin positioned to receive the uranium enriched ammonium carbonate stream and separate uranium species therefrom; and
an anion solution stream positioned to feed a solution comprising anions onto the ion exchange resin to form a loaded uranium eluant stream.

10. The system of claim 9, wherein the organic solvent comprises di(2-ethylhexyl)phosphoric acid and trioctylphosphine oxide.

11. The system of claim 9, wherein the oxidant is at least one oxidant selected from the group consisting of air, oxygen, hydrogen peroxide, and WPA.

12. The system of claim 9, wherein the anions in the solution comprising anions are at least one anion selected from the group consisting of chloride anions, sulphate anions, and nitrate anions.

13. The system of claim 9, wherein the anions in the solution comprising anions includes chloride ions.

14. The system of claim 9, further comprising a valency reduction stage upstream from the ion exchange resin for reducing a valency of ferric ions in the uranium laden WPA before the uranium laden WPA contacts the ion exchange resin.

15. The system of claim 9, wherein the ion exchange resin is a chelating ion exchange resin.

* * * * *